(12) United States Patent
Forrester, Jr. et al.

(10) Patent No.: US 11,078,997 B2
(45) Date of Patent: Aug. 3, 2021

(54) MOTOR DRIVEN ELECTROMECHANICAL ACTUATOR

(71) Applicant: NATIONAL MACHINE COMPANY, Stow, OH (US)

(72) Inventors: Raymond Alvero Forrester, Jr., Akron, OH (US); Robert William Hyde, Stow, OH (US)

(73) Assignee: NATIONAL MACHINE GROUP, Stow, OH (US)

( * ) Notice: Subject to any disclaimer, the term of this patent is extended or adjusted under 35 U.S.C. 154(b) by 656 days.

(21) Appl. No.: 15/746,281

(22) PCT Filed: Jul. 20, 2016

(86) PCT No.: PCT/US2016/043115
§ 371 (c)(1),
(2) Date: Jan. 19, 2018

(87) PCT Pub. No.: WO2017/015355
PCT Pub. Date: Jan. 26, 2017

(65) Prior Publication Data
US 2018/0216712 A1    Aug. 2, 2018

Related U.S. Application Data

(60) Provisional application No. 62/194,611, filed on Jul. 20, 2015.

(51) Int. Cl.
*F16H 1/16*     (2006.01)
*F16H 37/04*    (2006.01)
(Continued)

(52) U.S. Cl.
CPC ............. *F16H 37/041* (2013.01); *F16H 1/16* (2013.01); *F16H 7/02* (2013.01); *F16H 7/023* (2013.01);
(Continued)

(58) Field of Classification Search
CPC ... F16H 1/16; F16H 7/02; F16H 7/023; F16H 57/031; F16H 57/035; F16H 57/039; H02K 11/215; H02K 11/25; H02K 7/1166
(Continued)

(56) References Cited

U.S. PATENT DOCUMENTS 3,572,449 A * 3/1971 Brocas ............... E21B 7/001
                                              175/57
3,651,711 A   3/1972 Greenwood et al.
(Continued)

FOREIGN PATENT DOCUMENTS

| DE | 29600462 U1 | 4/1996 |
| FR | 2756318 A1 | 5/1998 |
| WO | 02084151 A1 | 10/2002 |

OTHER PUBLICATIONS

Dual Motor Low Profile Actuator. ITT Aerospace. Jun. 22, 2016. https://www.ittaerospace.com/Products/Dual-Motor-Low-Profile-Actuator/.
(Continued)

*Primary Examiner* — William C Joyce
(74) *Attorney, Agent, or Firm* — Vorys, Sater, Seymour and Pease LLP; Scott M. Guttman (57) ABSTRACT

A motor driven electromechanical actuator assembly includes a motor assembly having a motor shaft and a gear assembly. The gear assembly includes a plurality of gears with a belt drive that couples the motor assembly to the actuator output shaft. The actuator assembly also includes a position sensor system configured to determine a rotational characteristic of the drive shaft.

20 Claims, 12 Drawing Sheets

(51) Int. Cl.
    *F16H 7/02*          (2006.01)
    *H02K 11/215*     (2016.01)
    *H02K 11/25*      (2016.01)
    *F16H 57/031*     (2012.01)
    *F16H 57/035*     (2012.01)
    *F16H 57/039*     (2012.01)
    *H02K 7/116*      (2006.01)
    *F16H 57/02*      (2012.01)

(52) U.S. Cl.
    CPC ......... *F16H 57/031* (2013.01); *F16H 57/035* (2013.01); *F16H 57/039* (2013.01); *H02K 7/1166* (2013.01); *H02K 11/215* (2016.01); *H02K 11/25* (2016.01); *F16H 2057/02034* (2013.01)

(58) Field of Classification Search
    USPC .................................................. 74/425, 625
    See application file for complete search history.

(56) References Cited

U.S. PATENT DOCUMENTS

| | | | |
|---|---|---|---|
| 4,403,449 A | | 9/1983 | Richmond |
| 4,827,790 A | * | 5/1989 | Bisiach ................ F16H 1/16 74/398 |
| 5,127,113 A | | 7/1992 | Di Matteo et al. |
| 5,345,834 A | * | 9/1994 | Hayashi ............... F16H 1/16 74/421 A |
| 5,475,930 A | * | 12/1995 | Kimura ................ F16H 1/16 33/290 |
| 5,584,515 A | | 12/1996 | Silye |
| 5,661,384 A | | 8/1997 | Glibbery |
| 5,801,501 A | | 9/1998 | Redelberger |
| 5,823,054 A | * | 10/1998 | Brouwer ............. B60Q 1/076 74/425 |
| 5,970,813 A | * | 10/1999 | Parkins ................ F16H 1/16 114/366 |
| 6,195,940 B1 | * | 3/2001 | Moy .................... E05F 15/63 49/324 |
| 6,554,337 B2 | | 4/2003 | Kazerooni et al. |
| 6,603,305 B2 | * | 8/2003 | Uchiyama .......... G01D 5/34738 324/207.2 |
| 6,820,579 B2 | | 11/2004 | Kawamura et al. |
| 6,883,999 B1 | * | 4/2005 | Jenkins ................ F16H 1/16 192/12 R |
| 7,140,571 B2 | | 11/2006 | Hishon et al. |
| 7,161,322 B2 | | 1/2007 | Wang et al. |
| 7,215,115 B2 | * | 5/2007 | Saito .................... F16H 59/70 324/207.21 |
| 7,261,012 B2 | * | 8/2007 | Meyer .................. B60R 1/074 324/207.22 |
| 7,308,873 B2 | | 12/2007 | Arai et al. |
| 7,950,550 B2 | | 5/2011 | Webster et al. |
| 8,333,129 B2 | | 12/2012 | Johnson et al. |
| 8,744,621 B2 | | 6/2014 | Michael |
| 8,994,776 B2 | | 3/2015 | Sutherland et al. |
| 9,068,903 B2 | | 6/2015 | Mankame et al. |
| 9,550,262 B2 | * | 1/2017 | Fukano ................ B25B 5/108 |
| 2007/0205232 A1 | * | 9/2007 | Doyle ................... C02F 1/008 222/544 |
| 2008/0017150 A1 | | 1/2008 | Tsuchida et al. |
| 2008/0045925 A1 | | 2/2008 | Stepovich et al. |
| 2009/0078489 A1 | | 3/2009 | Feier et al. |
| 2011/0041800 A1 | * | 2/2011 | Wong ................... F02D 11/106 123/319 |
| 2014/0202274 A1 | * | 7/2014 | Durand ................ F16H 37/02 74/425 |
| 2015/0035658 A1 | | 2/2015 | Provancher et al. |

OTHER PUBLICATIONS

Industrial Robot: An International Journal, vol. 28, No. 4, 2001, pp. 346 and 347. http://dialog.proquest.com/professional/docview/2017022421?accountid=157282.

How to achieve very accurate/fine rotation with motor. Oct. 7, 2015. StackExchange. http://electronics.stackexchange.com/questions/193905/how-to-achieve-very-accurate-fine-rotation-with-motor.

International Search Report and Written Opinion. International Application No. PCT/US2016/043115. Applicant: National Machine Group. Authorized Officer Blaine R. Copenheaver. International Filing Date Jul. 20, 2016. dated Sep. 22, 2016. Forms PCT/ISA/220, PCT/ISA/210 and PCT/ISA/237.

\* cited by examiner

MOTOR DRIVEN ELECTROMECHANICAL ACTUATOR

This application claims the benefit of PCT/US2016/043115, filed Jul. 20, 2016, and U.S. Provisional Application No. 62/194,611, filed Jul. 20, 2015.

TECHNICAL FIELD

The present subject matter is related to an actuator and, more particularly, to a motor driven electromechanical actuator that has a relatively small space envelope.

BACKGROUND

Actuators are used in myriad devices and systems. For example, many vehicles such as aircraft, spacecraft, watercraft, and numerous other terrestrial and non-terrestrial vehicles, include one or more actuators to effect the movement of various control surfaces and/or components therein. No matter the specific end-use, actuators are often classified based on the power source that is used to effect actuation. For example, actuators are often classified as hydraulic-operated, pneumatic-operated, or electrically-operated (also known as electromechanical) actuators.

Electromechanical actuators typically include an actuation element, such as a gear assembly or screw, which is driven by an electric motor. In many applications, it is desirable to utilize an electromechanical actuator having a relatively small size and low weight. Other actuators have achieved these goals by using a relatively small electric motor that rotates at a relatively high rotational speed, and then including some type of gear reduction to increase the output torque of the actuator. While this approach generally works well, it has noticeable drawbacks. For example, the gear reduction needed to achieve the desired torque output may cause the size and/or weight of the actuator to be greater than desired, as gears are typically made of heavy and dense metals. Other actuators have achieved the high torque and low size/weight goals by implementing a low profile motors with worm drives and mechanical switches; however, these low profile style actuators have major drawbacks in that their motors are cantilevered. The cantilevered motor causes a bending moment on the actuator, which, along with the mechanical switches, is a source of failure. Moreover, the most common source of failure in actuators is due to motor overheating, which is often caused by a stall condition such as a blockage that, for example, prohibits an output drive from rotation. Some actuators protect against this stall condition and the resulting overheating by measuring the motor's current draw rather than measuring the motor's temperature.

Hence, there is a need for an electromechanical actuator that includes a small, high speed motor with sufficient gear reduction having a relatively small space envelope and/or relatively smaller weight as compared to known electromechanical actuator configurations, and/or an actuator assembly that can be configured with an output disposed at an angle relative to the motor axis of rotation without the need for relatively heavy, large, and complex gearing. Moreover, there is a need for a stall torque prevention system that doesn't detect stall conditions by current draw, but instead detects stall conditions by sensing engine temperature. The present invention addresses one or more of these needs.

DETAILED DESCRIPTION

The terms "about" or "substantially" as used herein refers to a quantity, level, value, dimension, size, or amount that varies to some extent based on the context in which it is used. For example, such variation can be by as much as 5%. At the least, each numerical parameter can be construed in light of the number of reported significant digits and by applying ordinary rounding techniques.

It should be understood that the terms "a" and "an" as used above and elsewhere herein refer to "one or more" of the enumerated components. It will be clear to one of ordinary skill in the art that the use of the singular includes the plural unless specifically stated otherwise. Therefore, the terms "a," "an" and "at least one" are used interchangeably in this application. For example, "a" screw refers to both one screw or a group comprising two or more screws.

Unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought.

Throughout the application, descriptions of various embodiments use "comprising" language; however, it will be understood by one of skill in the art, that in some specific instances, an embodiment can alternatively be described using the language "consisting essentially of" or "consisting of."

For the purpose of clarity, any element or feature of any method or composition described herein can be combined with any other element or feature of any other method or composition described herein.

Figure 1:
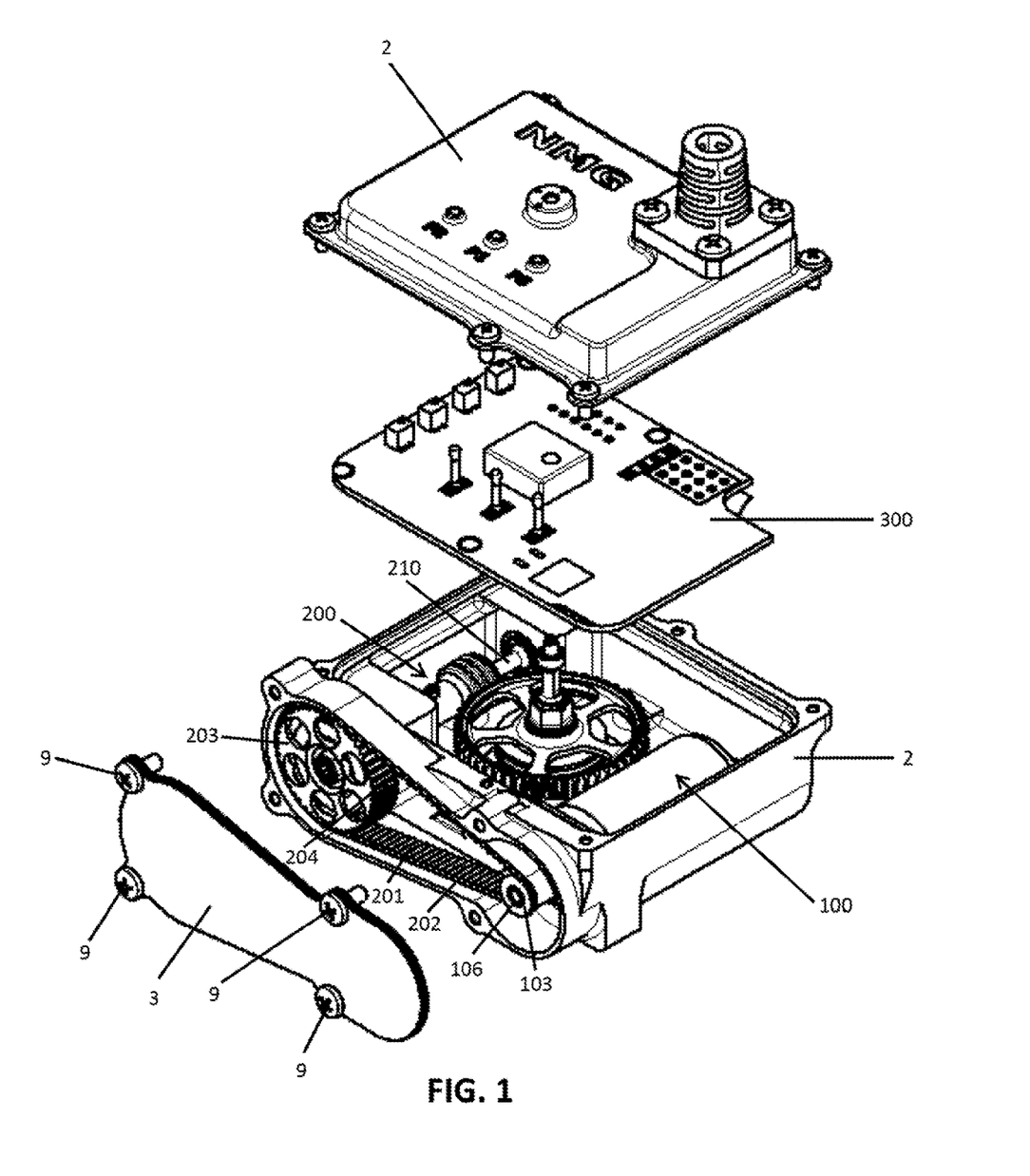
FIG. 1 is an exploded isometric top view of the actuator.
Figure 2A:
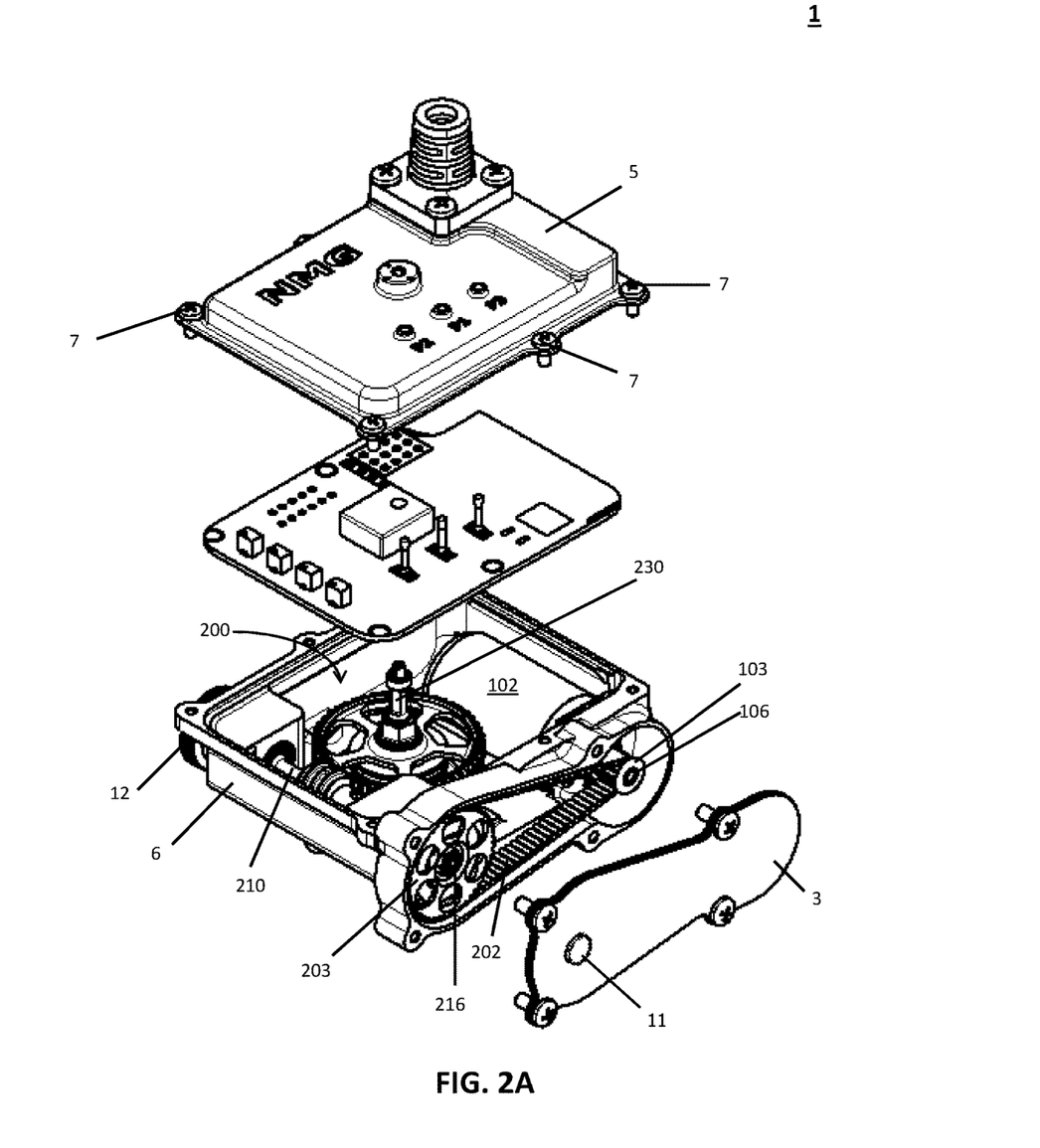
FIG. 2A is an exploded isometric top view of the actuator that is rotated ninety degrees (90°) to the right from the view depicted in FIG. 1.
Figure 2B:
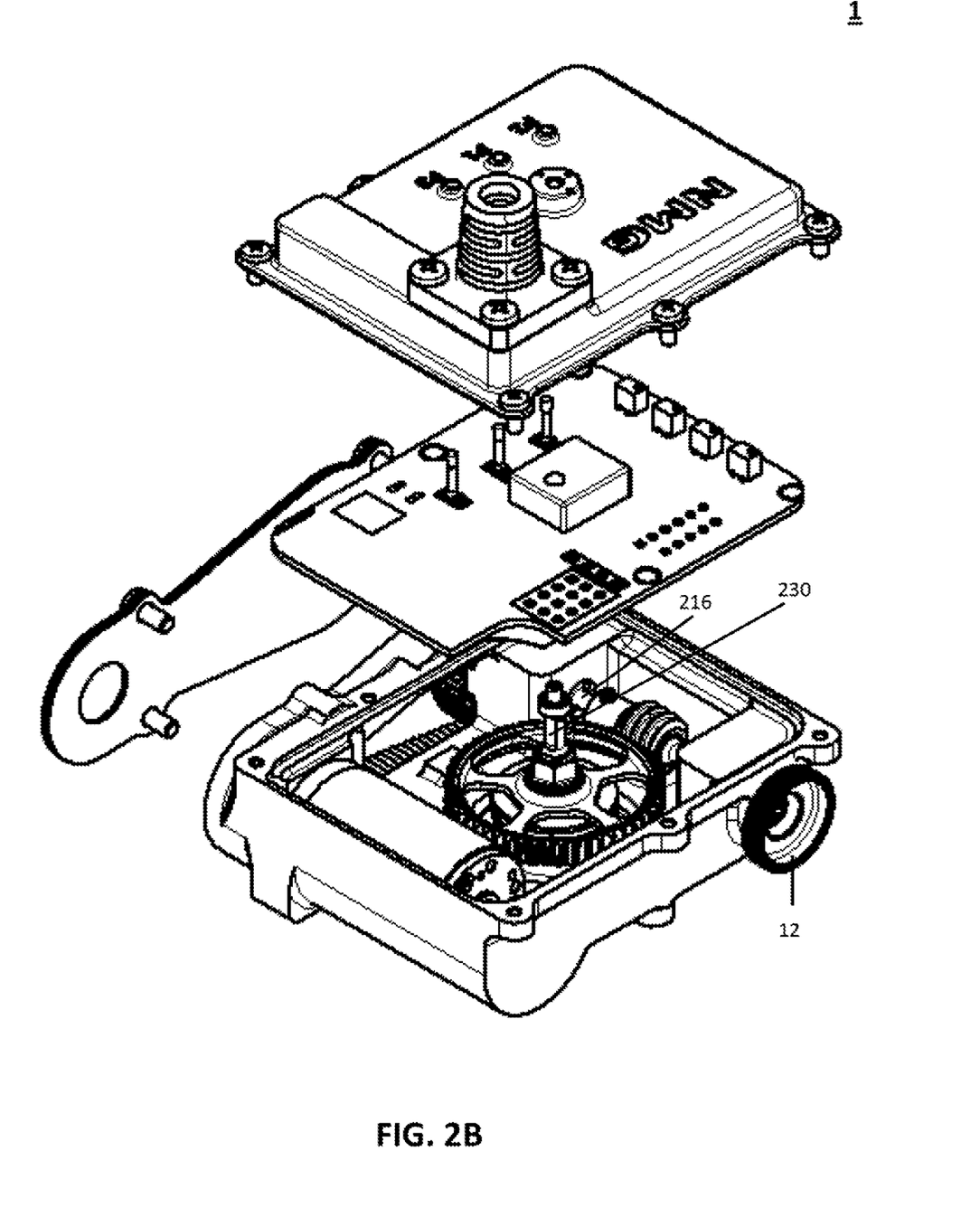
FIG. 2B is an exploded isometric top view of the actuator that is rotated ninety degrees (90°) to the left from the view depicted in FIG. 1.

Turning to FIG. 1, shown is an exploded view of an exemplary embodiment of the interconnected internal components of the actuator 1. The actuator 1 generally includes a motor assembly 100, a gear assembly 200, and a circuit board 300, which may include any number of sensing systems and other features. The motor assembly 100, a gear assembly 200, and a circuit board 300 may be enclosed in a housing 2, such as the illustrated two (2) piece housing. Housing 2 may include a drive belt cover 3 that is removable to expose the drive belt 201 and facilitate replacement and/or maintenance of the same. Belt cover 3 may be fixed to housing 2 by any commercially available means and, in one embodiment, belt cover screws 9 are utilized to fix belt cover 3 to housing 2.

Figure 3:
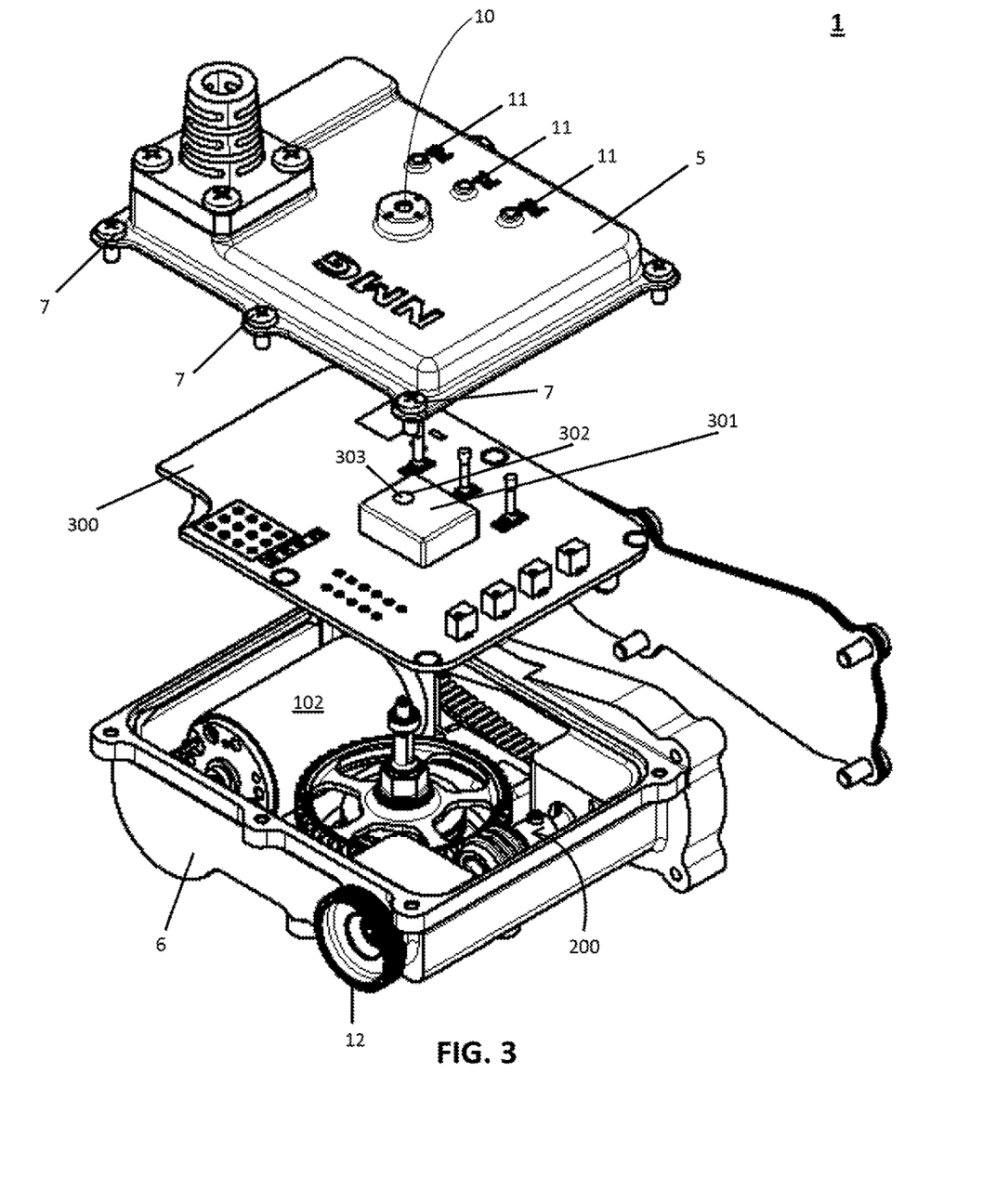
FIG. 3 is an exploded isometric top view of the actuator that is rotated ninety degrees (90°) to the right from the view depicted in FIG. 2A.
Figure 5:
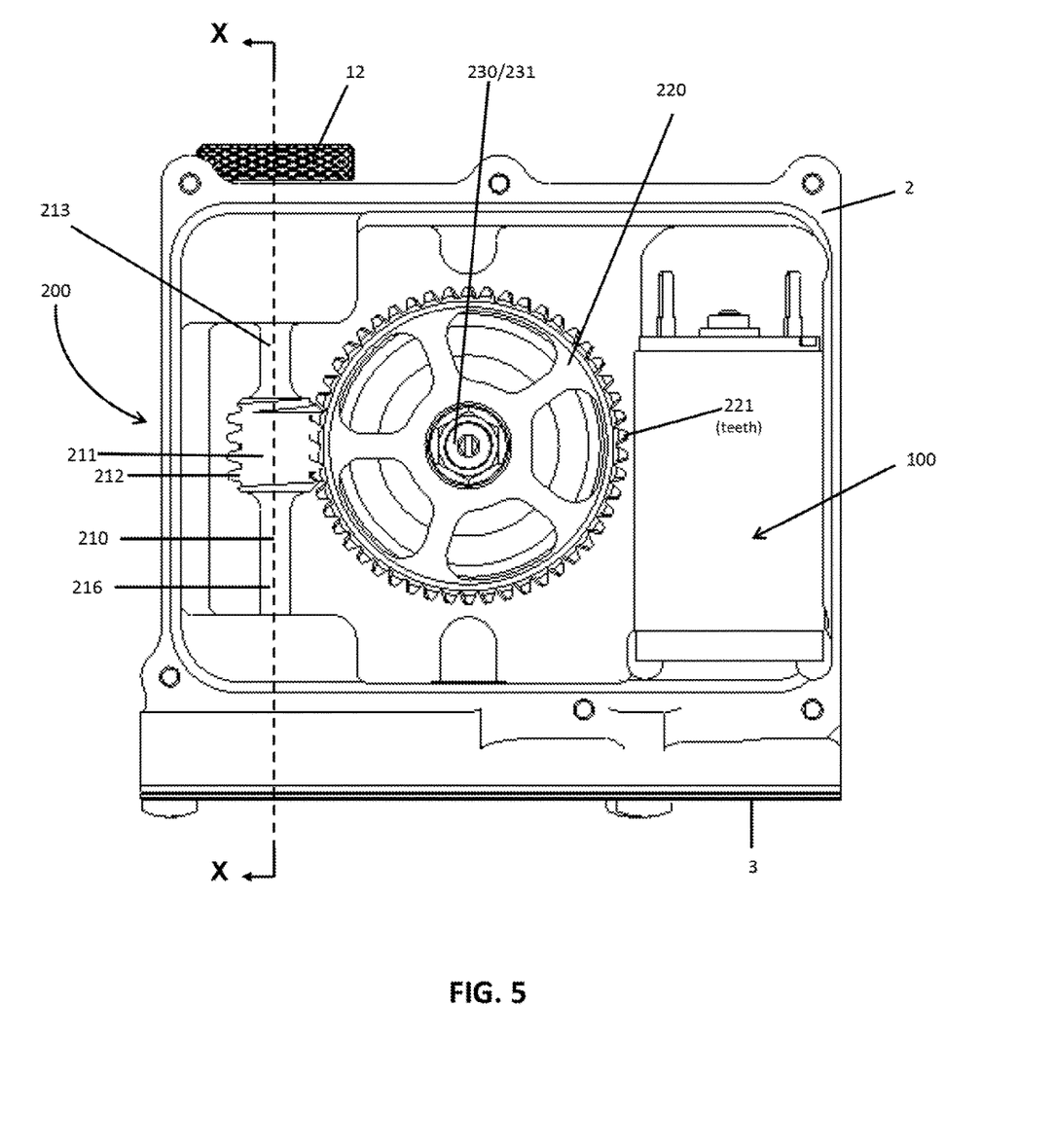
FIG. 5 is a cut-a-way top view of the actuator.

Drive belt cover 3 may include a back drive cap 11 that is removable to expose the sprocket end 216 of the worm screw shaft 210, such that a user may manually back drive the worm screw shaft 210, thereby reversing rotation of the drive shaft 230. For example, sprocket end 216 may be adapted to receive an Allen wrench or other means by which a user may manually rotate worm screw shaft 210, which effectively results in manual drive shaft 230 rotation. An alternate method of manually back driving worm screw shaft 210 and drive shaft 230 is also depicted. For example, back-drive wheel 12 may be connected to the other end of worm screw shaft 210 (i.e., opposite sprocket end 216) and disposed on the exterior of housing 2, so that a user may manually access and rotate wheel 12. This manual rotation of wheel 12 results in rotation of worm screw shaft 210 and drive shaft 230, and is best illustrated in FIGS. 3 and 5.

In some embodiments, housing 2 is a two-part housing comprising a housing cover 5 and housing base 6 such that a user may access the internal components of actuator 1 such as the motor assembly 100 and/or the gear assembly 200. Thus, the user of actuator 1 may access the internal envelope defined by housing 2 to repair and/or replace components of actuator 1. Thus, housing 2 may include housing cover 5 that may be mounted to housing base 6 of housing 2 by any number of screws 7. Alternatively, housing cover 5 could be mounted to housing base 6 by way of magnets or other latching mechanisms. In other embodiments, housing cover 5 could be hinged along a side of housing base 6 to facilitate the "opening" of housing cover 5 with respect to housing base 6 in the same manner in which a door is opened. In this latter embodiment, when housing cover 5 is in a "closed" position with respect to housing base 6, the housing cover 5 could be secured to housing base 6 by any commercially available means including those described above.

The motor assembly 100 includes a motor (not shown), which is preferably enclosed within a motor housing 102, and motor shaft 103. The motor is preferably an electric motor, and may be any one of numerous types of AC or DC motors now known or developed in the future including, for example, an AC induction motor, a brushless DC motor, or a brushed DC motor. In a preferred embodiment, however, the motor is implemented as a brushless DC motor. Although the motor is preferably implemented as an electric motor, it will nonetheless be appreciated that the motor could be implemented, if so desired, as a pneumatic or hydraulic motor.

The motor shaft 103 extends from the motor housing 102 and is coupled to the gear assembly 200. The motor shaft 103 has two ends, a motor end (not shown) that is situated within the motor housing 102 and a sprocket end 106. The sprocket end 106 of the motor shaft 103 is adapted to receive a drive belt 201 along the outer circumferential surface of the sprocket end 106. The sprocket end 106 receives drive belt 201 by way of a plurality of driving teeth (not shown) that engage a plurality of drive belt teeth 202 on the drive belt 201.

Figure 4A:
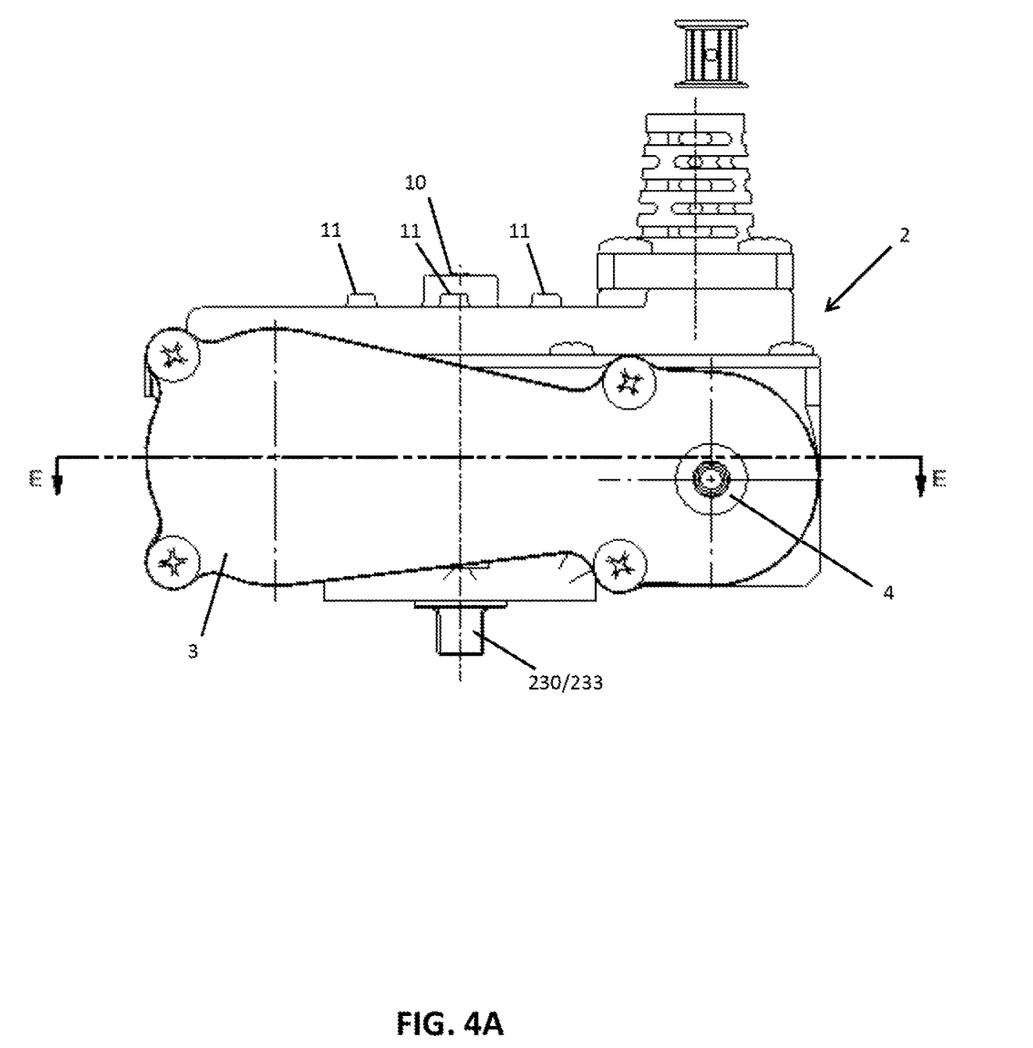
FIG. 4A is a side view of the actuator.
Figure 4B:
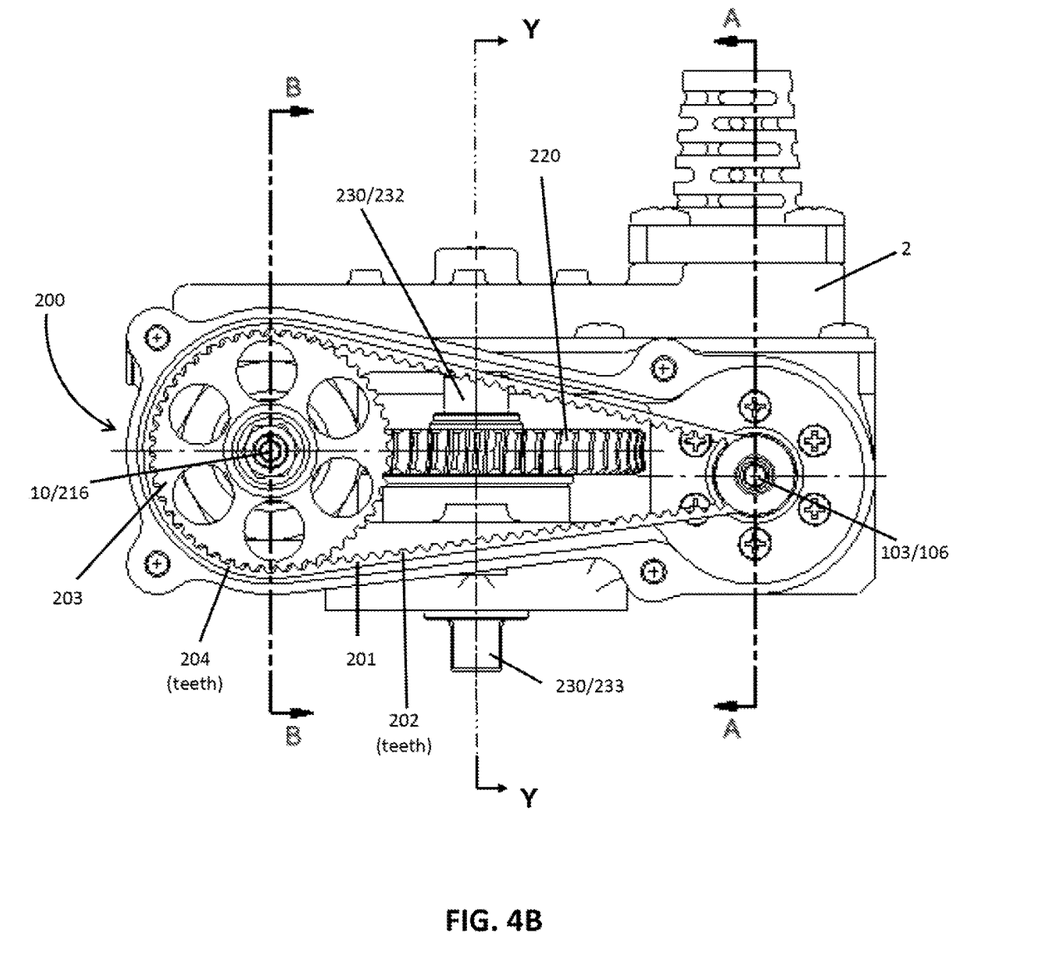
FIG. 4B is a cut-a-way side view of the actuator illustrated in FIG. 4A.
Figure 6:
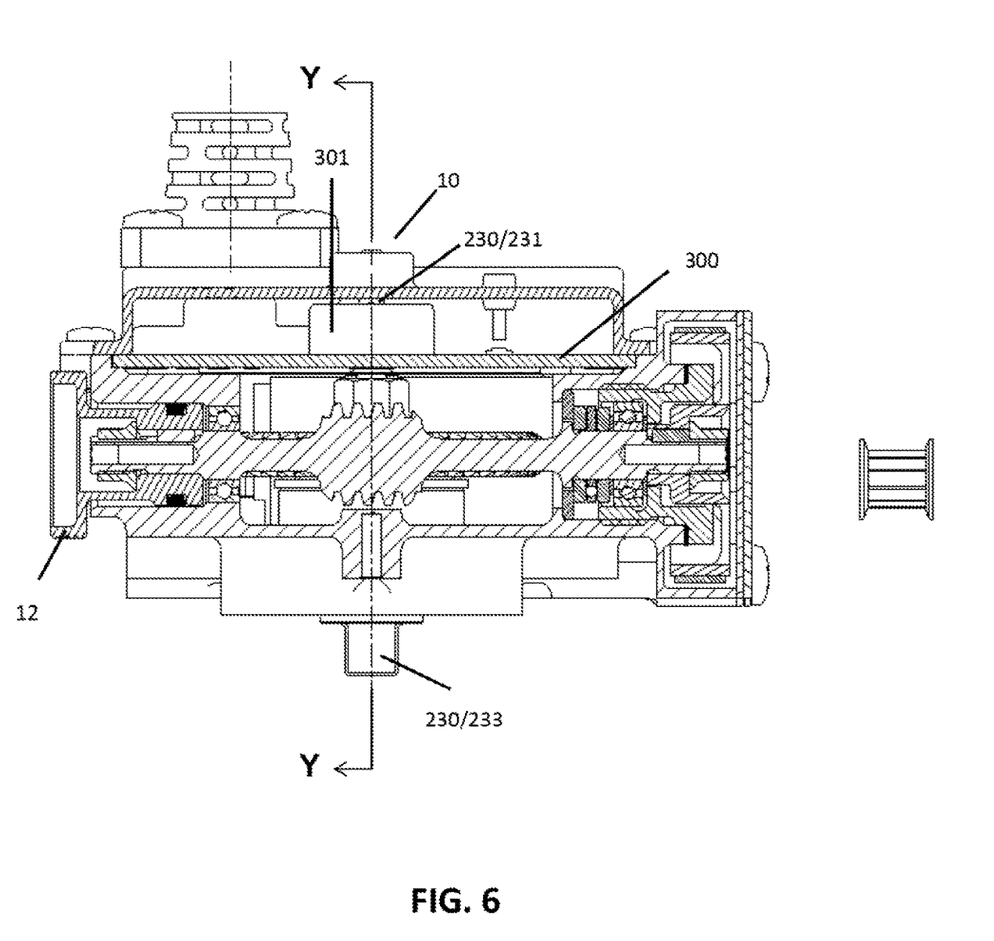
FIG. 6 is a cut-a-way side view of the actuator that is rotated one-hundred and eighty degrees (180°) from the view depicted in FIGS. 4A and 4B.

As depicted in FIGS. 4 through 6, the gear assembly 200 of actuator 1 comprises a drive belt 201 (having a plurality of drive belt teeth 202); a sprocket 203 having a plurality of sprocket teeth 204 along the sprocket's 203 outer circumferential surface; a worm screw shaft 210 having a worm screw portion 211, a sprocket end 216 and an opposing end 213; and a drive gear 220 that is disposed on the drive shaft 230.

Gear assembly 200 is coupled to the motor assembly 100 by way of the drive belt 201. Sprocket 203 is adapted to receive a drive belt 201 along its outer circumferential surface whereby the plurality of drive belt teeth 202 engage the plurality of sprocket teeth 204. The worm screw shaft 210 has a worm screw portion 211, a sprocket end 216 and an opposing end 213. Sprocket 203 is rotatably mounted about a longitudinal axis X-X of the worm screw shaft 210, for example, at the sprocket end 216, such that sprocket 203 and worm screw shaft 210 rotate in tandem about axis X-X.

The drive gear 220 may have a plurality of teeth 221 along the circumference of its outer surface. Teeth 221 of drive gear 220 are engaged by screws 212 threaded along the outer surface of worm screw portion 211. Drive shaft 230 includes a sensor end 231, a middle portion 232, and a drive end 233. Drive gear 220 is longitudinally mounted along an axis Y-Y of drive shaft 230, preferably in the middle portion 232 thereof, such that drive gear 220 and drive shaft 230 rotate in tandem about axis Y-Y. As illustrated in FIG. 6, drive end 233 of drive shaft 230 may protrude from housing 2 at housing aperture 8, such that external equipment may be attached to drive shaft 230 and utilize the output of actuator 1.

The gear assembly 200 configuration described above has a relatively small and compact size when adapted for use within housing 2 such that there is extra unused space within the internal cavity of housing 2, and this extra unused space may be utilized by incorporating additional gearing and/or componentry. Moreover, gear assembly 200 may be implemented using any one of numerous configurations, and not just those configurations shown in the figures. For example, in applications where additional output torque is needed, additional gears may be incorporated within gear assembly 200 in addition to drive gear 230 or, alternatively, drive gear 230 may be replaced by a planetary gearing system or other gearing system that would offer increased output torque. When motor assembly 100 and gear assembly 200 are assembled together, actuator 1 is lighter in weight and more efficient than other commercially available actuators.

Figure 7A:
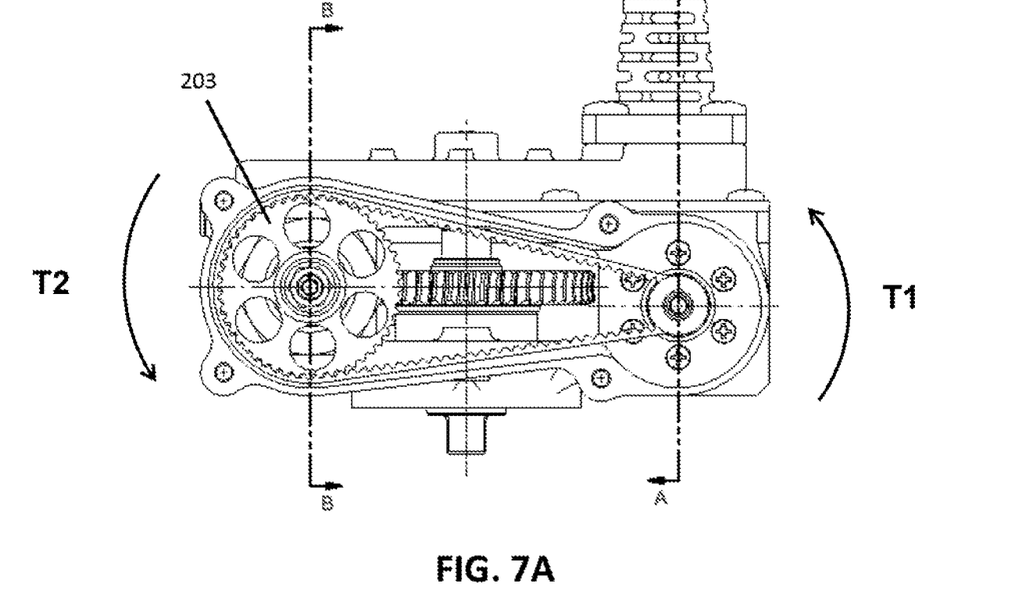
FIG. 7A is another cut-a-way side view of the actuator.
Figure 7B:
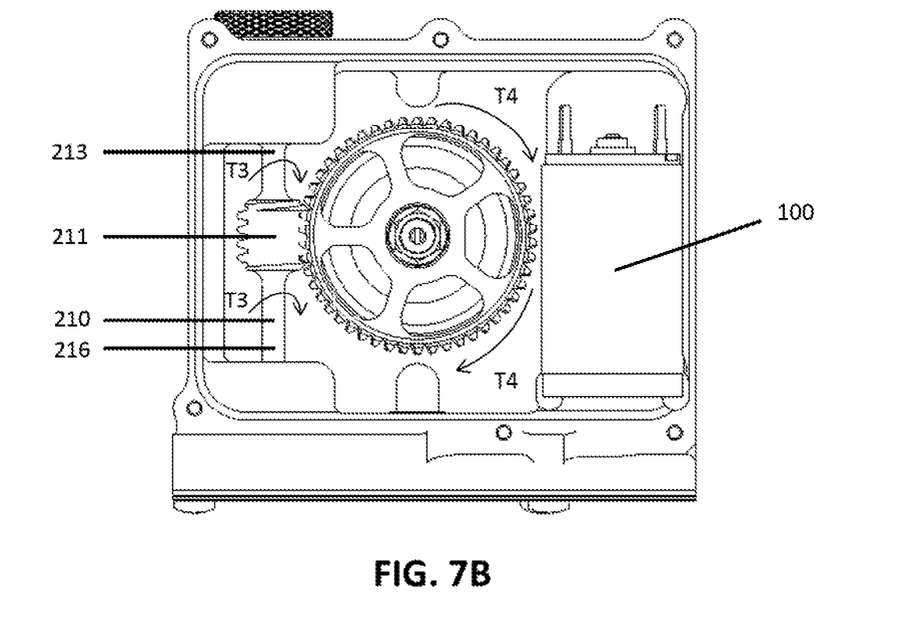
FIG. 7B is another cut-a-way top view of the actuator.
Figure 8A:
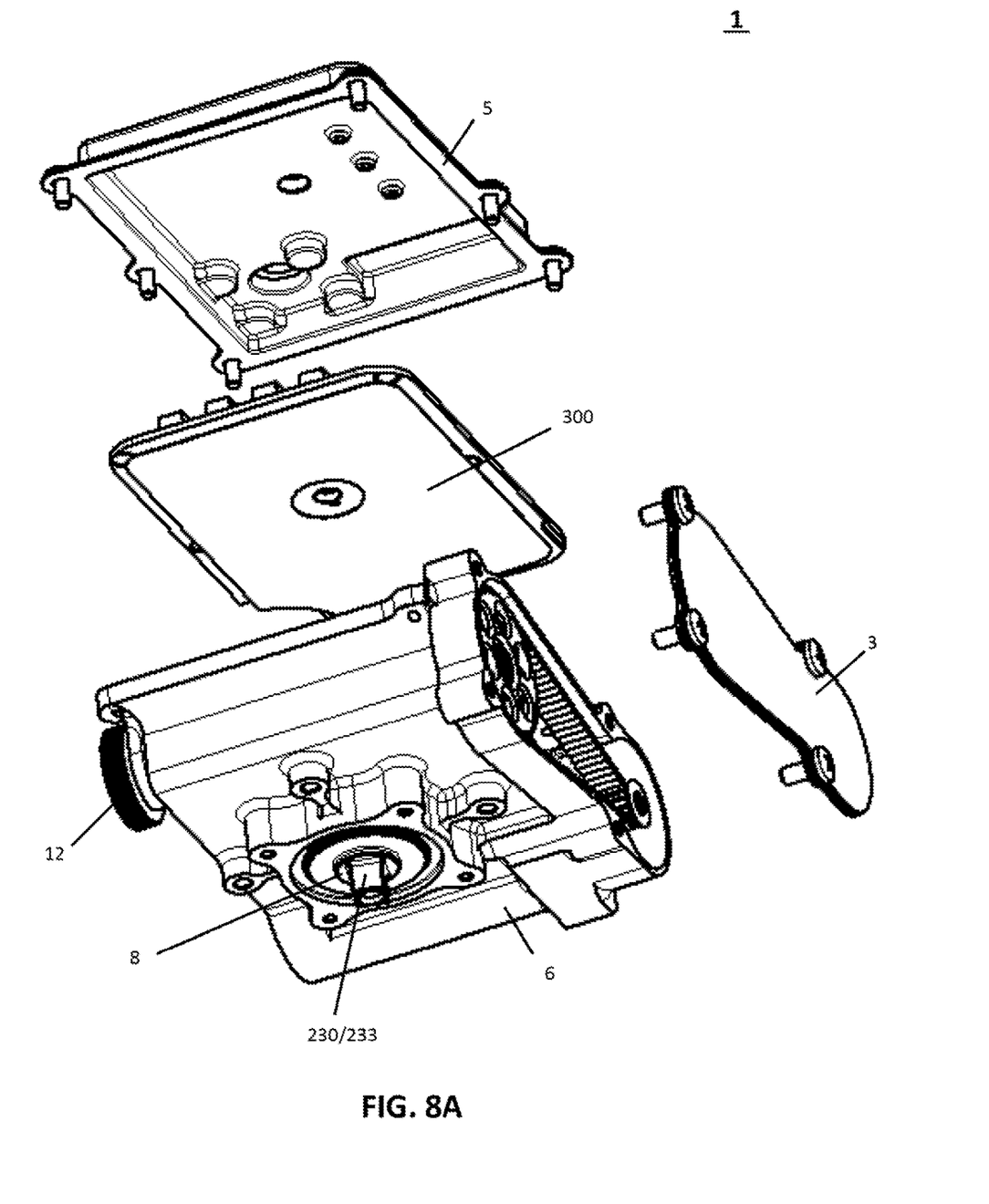
FIG. 8A is an exploded isometric bottom view of the actuator.
Figure 8B:
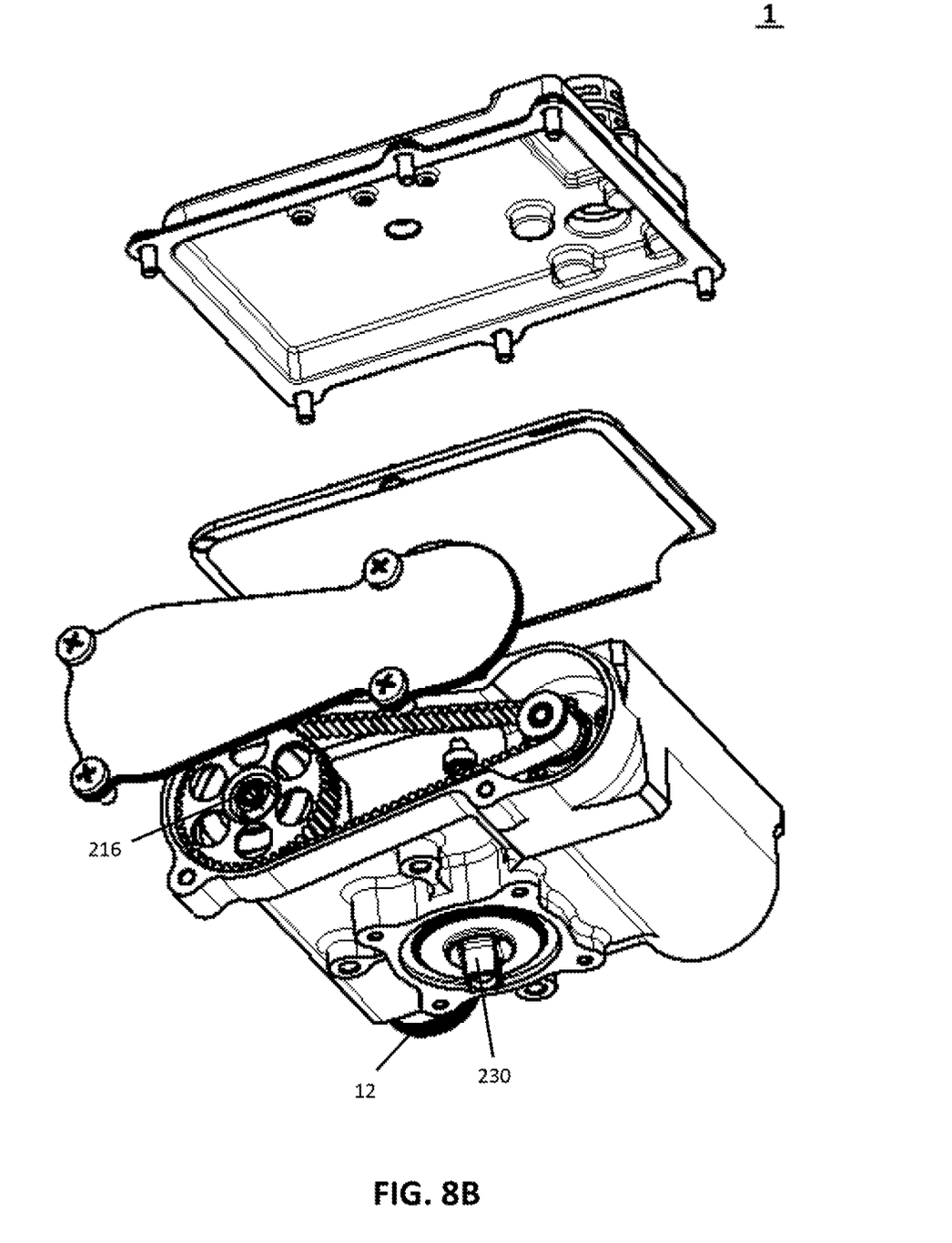
FIG. 8B is an exploded isometric bottom view of the actuator that is rotated ninety degrees (90°) from the view depicted in FIG. 8A.

When in use and as depicted in FIGS. 7A and 7B, motor rotates and imparts a first torque (denoted by arrow T1) on motor shaft 103. Motor shaft 103 drives drive belt 201, which in turn imparts a second torque (denoted by arrow T2) on sprocket 203. Second torque T2 rotates sprocket 203 as well as worm screw shaft 210. Because the worm screw portion 211 is fixed to worm screw shaft 210, a third torque (denoted by arrow T3) is imparted on worm screw portion 211 via sprocket 203, causing worm screw shaft 210 to rotate about axis X-X. As worm screw portion 211 of worm screw shaft 210 rotates, it in turn causes drive gear 220 (and drive shaft 230 fixed thereto) to rotate about axis Y-Y, thereby supplying a rotational drive force (i.e., the output torque denoted by arrow T4) to drive shaft 230. This resulting output torque T4 may be utilized by external equipment that is connected to actuator 1, for example, at drive end 233 of drive shaft 230.

Actuator 1 may include a position sensor system. In some embodiments, the position sensor is an integrated chip 301 on circuit board 300. Position sensor integrated chip 301 is adapted to receive sensor end 231 of drive shaft 230 and, in embodiments incorporating housing 2, circuit board 300 and the position sensor integrated chip 301 may be adapted to fit within the internal envelope defined by the cavity of housing 2. In embodiments utilizing the position sensor integrated chip 301, the integrated chip 301 may include a rotational collar 302 that is positioned to rotate within a receiving port 303 and oriented along axis Y-Y. Collar 302 may span the entire height of integrated chip 301 along axis Y-Y or, alternatively, be disposed on a top side or bottom side of the integrated chip 301, or on both top and bottom sides of integrated chip 301.

The position sensor integrated chip 301 may also include a Hall effect sensor (not shown) and magnet (not shown). In this embodiment, sensor end 231 of drive shaft 230 may be inserted into receiving port 303 and fastened to rotational collar 302. When sensor end 231 of drive shaft 230 is fastened to rotational collar 302, the two elements rotate in tandem such that the Hall effect sensor and magnet of integrated chip 301 may determine a rotational characteristic of the rotational collar 302 and, thereby, determine the rotational position of drive shaft 230 along with any external equipment attached thereto.

Position sensor integrated chip 301 may also provide a user with feedback concerning the foregoing rotational characteristic and/or rotational position of drive shaft 230. For example, when drive end 233 of drive shaft 230 is connected to external equipment, such as a valve having an open and close position that respectively correspond to certain rotational orientations of drive shaft 230 about axis Y-Y, the position sensor integrated chip 301 may determine whether the external equipment is in the open or closed condition based upon the position of the drive shaft 230 and/or rotational collar 302 within the receiving port 303, as determined by the Hall effect sensor and magnet, and transmit that information to a user/operator. The position sensor integrated chip 301 may be any type of commercially available Hall effect rotary position sensor. For example, the position sensor integrated chip 301 may be a through shaft Hall-Effect rotary position sensor obtained from the company Piher Sensors & Controls SA ("Piher"), such as the MTS-360, PST-360 or MTS-360 PCB. It should be appreciated, however, that other models and varieties of positions sensors may be utilized, regardless of whether they are manufactured by Piher.

The actuator 1 depicted and described herein includes a relatively small, low power electric motor that is configured to run at a relatively high rotational speed and relatively low torque. Gear assembly 200 reduces that rotational speed and increases the output torque (T4) as exerted through drive 230. Where drive belt 201 is incorporated into gear assembly 200, actuator 1 will be lighter and more efficient than other actuators on the market that utilize gears in lieu of belt drives. This is because belts are manufactured of materials that are lighter in weight than typical gearing systems that are comprised of solid and dense metal components. Belt drive systems are therefore more efficient than other system configurations comprised entirely of gears.

In another embodiment, actuator 1 includes a temperature sensor (not shown). If housing 2 is utilized, temperature sensor would be situated therein, for example, on circuit board 300. Where utilized, temperature sensor 400 will sense the temperature of motor assembly 100 and, in response to increased motor temperatures, the pulse width modulation control of the motor would be proportionately reduced in response to rising temperatures as sensed by temperature sensor. Generally, electric motors continue to provide torque when in a stalled condition; however, electric motors left in such a stalled condition are prone to overheating and possible damage resulting therefrom, as the current flow into the motor is maximized under these conditions. Overheating is therefore a prevalent source of failure for actuators. Currently available actuators that have systems to detect and prevent damage when subjected to stall conditions measure the motor's current draw to detect stall conditions. Instead, actuator 1 could include a temperature sensor to directly measure motor assembly's 100 temperature, which is the source of any damage resulting from the stall condition, rather than the increased current draw resulting from the stall condition.

For example, temperature sensor could measure the temperature of motor housing 102 and, when continuous temperatures above a certain threshold are detected for a prolonged period of time (e.g., 10 seconds of operation), motor would switch to a secondary stall condition mode by way of a microcontroller (not shown). This secondary stall condition mode would protect the motor assembly 100 from the combination of high ambient temperature conditions, as well as extended current draw resulting in motor over-heating and failure. When the blockage or other condition causing the stall condition is removed, no reset would be required, as the power is maintained to the actuator 1, and the actuator 1 and any external equipment attached thereto would continue to operate as intended.

Figure 9:
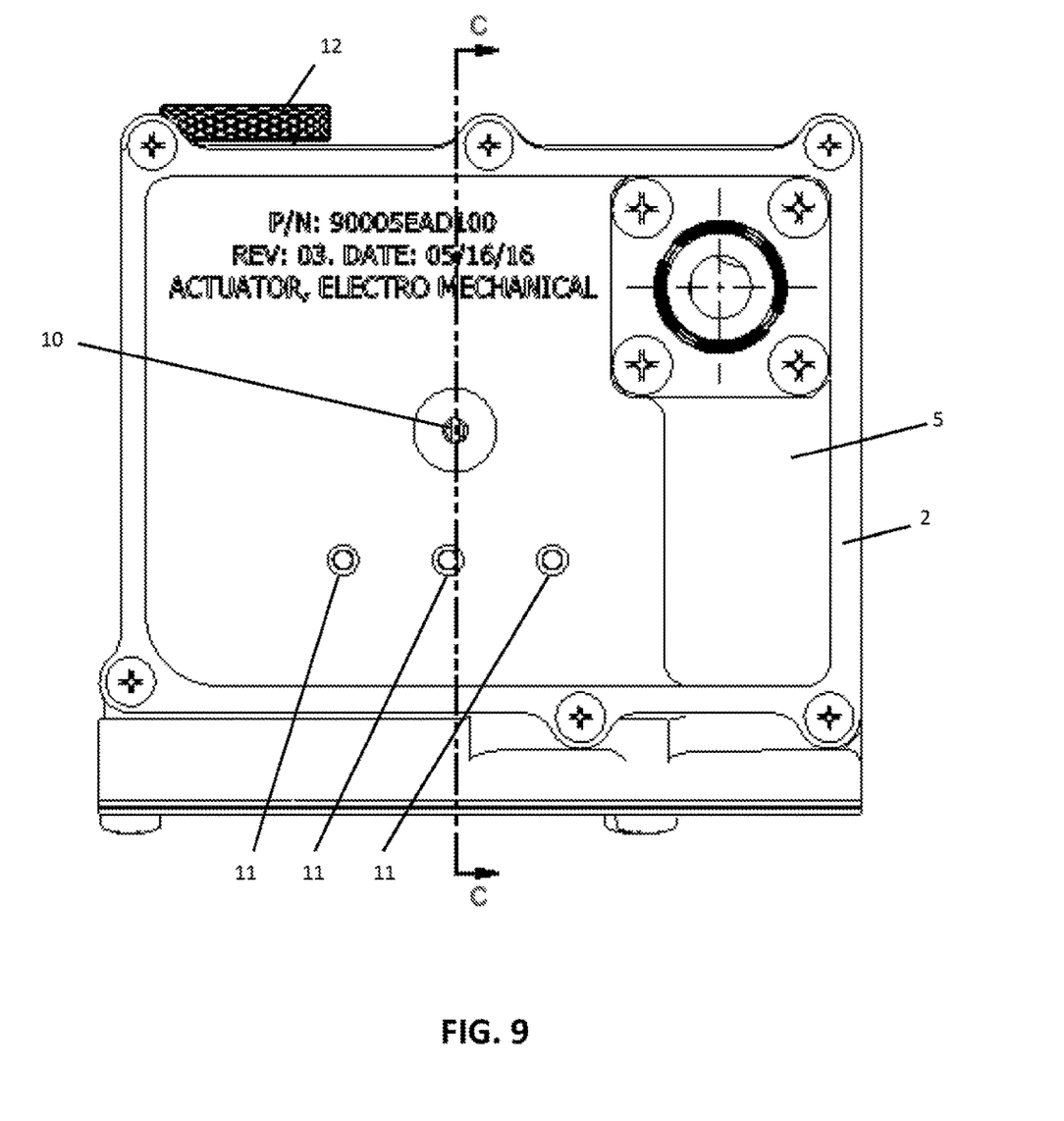
FIG. 9 is a top view of the actuator within a housing.

In another embodiment, housing 2 of actuator 1 contains a visual position indicator 10. As exemplified in FIG. 9, visual position indicator 10 may be located on the external surface of housing cover 5 such that the operator of actuator 1 may determine the rotational configuration of drive shaft 230. In embodiments of actuator 1 utilizing the visual position indicator 10, sensor end 231 of drive shaft 230 may be inserted into a first receiving port 303 on the underside of integrated chip 301 and continue through and exit a second receiving port 303 on the upper side of integrated chip 301, such that sensor end 231 contacts visual position indicator 10 of housing 2, rather than terminating at some point within integrated chip 301. Housing 2 may also include, in addition to visual position indicator 10 or in lieu thereof, one or more electrical position indicators 11, for example, one or more optical light tubes (i.e., light pipes) such as those purchased from the Dialight company.

All publications cited in the specification are indicative of the level of skill of those skilled in the art to which the presently described subject matter pertains. All of these publications are hereby incorporated by reference herein to the same extent as if each individual publication were specifically and individually indicated as being incorporated by reference.

The present subject matter being thus described, it will be apparent that the same may be modified or varied in many ways. Such modifications and variations are not to be regarded as a departure from the spirit and scope of the present subject matter, and all such modifications and variations are intended to be included within the scope of the following claims.

What is claimed:

1. An actuator, comprising:
   a housing defining an internal envelope and having a removable cover;
   a motor assembly provided on a surface of the internal envelope and comprising a motor and a motor shaft supported by the motor, the motor configured to supply a first torque to the motor shaft;
   a gear assembly comprising
      a drive belt coupled to receive the first torque from the motor shaft and coupled to supply a second torque to a sprocket fixed along an axis of a worm screw shaft, wherein the motor shaft and worm screw shaft extend into a first open side of the drive belt, and a second open side of the drive belt is exposed upon removal of the removable cover, a drive gear fixed along the axis of a drive shaft, the drive shaft having a sensor end, the drive gear being engaged along the outer surface of a worm screw portion to receive the second torque from the worm screw shaft and operable, in response thereto, to supply a drive torque to the drive shaft; and a position sensor system into which the sensor end of the drive shaft is inserted, and wherein the position sensor is configured to determine a rotational characteristic of the drive shaft, the position sensor system comprising a Hall effect sensor and a magnet.

2. The actuator of claim 1 further comprising a temperature sensor that detects a temperature of the motor and, when the temperature of the motor exceeds a threshold temperature, a controller switches the motor into a stall condition to prevent damage to the motor assembly.

3. The actuator of claim 1, wherein the actuator is contained in a housing.

4. The actuator of claim 3 wherein the worm screw shaft further comprises a backdrive, whereby the rotation of the drive shaft may be reversed.

5. The actuator of claim 4, wherein a back drive cap is provided on the removable cap and removable to expose the backdrive.

6. The actuator of claim 3 wherein a drive end of the drive shaft protrudes through the housing.

7. The actuator of claim 3 further comprising a visual position indicator that is located on an external surface of the housing.

8. The actuator of claim 1 wherein the motor is an electric motor.

9. The actuator of claim 1 wherein the position sensor further comprises an integrated chip having a rotational collar that is secured to the sensor end of the drive shaft, the rotational collar being rotatable within a receiving port disposed in the integrated chip.

10. The actuator of claim 1 further comprising one or more electrical position indicators.

11. The actuator of claim 1, wherein a portion of the housing separates the internal envelope of the housing within which the motor assembly is provided from an area of the internal envelope within which the drive belt is provided.

12. An actuator, comprising:

a housing defining an internal envelope and having a removable cover;

a motor assembly provided on a surface of the internal envelope and comprising a motor and a motor shaft, the motor configured to supply a first torque to the motor shaft;

a gear assembly comprising a drive belt coupled to receive the first torque from the motor shaft and coupled to supply a second torque to a sprocket fixed along an axis of a worm screw shaft, wherein the motor shaft and worm screw shaft extend into a first open side of the drive belt, and a second open side of the drive belt is exposed upon removal of the removable cover, a drive gear fixed along the axis of a drive shaft, the drive shaft having a sensor end, the drive gear coupled to receive the second torque from the worm screw shaft and operable, in response thereto, to supply a drive torque to the drive shaft;

a position sensor system configured to receive the sensor end of the drive shaft and to determine a rotational characteristic of the drive shaft, the position sensor system comprising a Hall effect sensor and a magnet; and a temperature sensor that detects a temperature of the motor and, when the temperature of the motor exceeds a threshold temperature, a controller switches the motor into a stall condition.

13. The actuator of claim 12, further comprising a visual position indicator that is located on an external surface of the housing.

14. The actuator of claim 12, wherein the worm screw shaft further comprises a backdrive, whereby the rotation of the drive shaft may be reversed.

15. The actuator of claim 14, wherein the removable cover is a having a back drive cap that is removable to expose the backdrive.

16. The actuator of claim 12 wherein a drive end of the drive shaft protrudes through the housing.

17. The actuator of claim 12 wherein the motor is an electric motor.

18. The actuator of claim 12 wherein the position sensor comprises a chip having a rotational collar that is secured to the sensor end of the drive shaft, the rotational collar being rotatable within a receiving port disposed in the chip.

19. An actuator, comprising:

a housing defining an internal envelope and having a removable cover;

a motor assembly provided on a surface of the internal envelope and comprising a motor and a motor shaft, the motor configured to supply a first torque to the motor shaft;

a gear assembly comprising a drive belt coupled to receive the first torque from the motor shaft and coupled to supply a second torque to a sprocket fixed along an axis of a worm screw shaft, wherein the motor shaft and worm screw shaft extend into a first open side of the drive belt, and a second open side of the drive belt is exposed upon removal of the removable cover, a drive gear fixed along the axis of a drive shaft, the drive shaft having a sensor end, the drive gear coupled to receive the second torque from the worm screw shaft and operable, in response thereto, to supply a drive torque to the drive shaft;

a position sensor configured to receive the sensor end of the drive shaft and to determine a rotational characteristic of the drive shaft, the position sensor comprising a Hall effect sensor;

a magnet, and a rotational collar secured to the sensor end of the drive shaft, the rotational collar being rotatable within a receiving port disposed on the integrated chip; and a temperature sensor that detects a temperature of the motor and, when the temperature of the motor exceeds a threshold temperature, a controller switches the motor into a stall condition.

20. The actuator of claim 19 wherein the removable cover is a drive belt covering having a back drive cap that is removable to expose the backdrive.

* * * * *